United States Patent [19]
Mason

[11] 3,789,824
[45] Feb. 5, 1974

[54] COOKING STRUCTURE
[75] Inventor: William B. Mason, Memphis, Tenn.
[73] Assignee: Barbecue Ovens, Inc., Memphis, Tenn.
[22] Filed: Dec. 4, 1972
[21] Appl. No.: 312,192

[52] U.S. Cl. ................................. 126/59.5, 99/480
[51] Int. Cl. ............................................ A01g 13/06
[58] Field of Search ... 126/59.5, 39 C; 99/480, 482, 99/473, 474, 481; 432/128, 130, 186; 34/214; 219/400, 393, 396, 399

[56] References Cited
UNITED STATES PATENTS

| | | | |
|---|---|---|---|
| 2,568,022 | 9/1951 | Parker | 99/473 |
| 3,190,281 | 6/1965 | Northwood | 126/59.5 |
| 2,789,877 | 4/1957 | Pfundt | 126/59.5 |

*Primary Examiner*—William E. Wayner
*Assistant Examiner*—W. E. Tapolcai, Jr.
*Attorney, Agent, or Firm*—Rodney Bedell; F. Travers Burgess

[57] ABSTRACT

A cooking structure comprising a pair of elongated insulated ovens spaced apart one above the other with individual doors at their adjacent ends, and a common upright flue at their opposite ends, there being removable grills between top and bottom of each oven. The lower portion of the lower oven forms a firebox with an outlet for the products of combustion at one end which may discharge into the flue or into the lower part of the upper oven according to the setting of a manually-adjustable damper. The upper oven has a horizontal passageway extending above the oven grill for the full length of the oven with a connection to the flue. Means are provided for supplying water or sauce to a grill in the upper oven and for discharging the same from the lower portion thereof. Preferably both ovens are enclosed in a sheet metal casing with inlets for an air supply to the firebox in the lower oven. The cooker eliminates continuous personal attention to broiling or barbecuing operations, moistens smoke from the logs or charcoal in the firebox which flows around meat on the grills breaking down tough fibers and permitting the natural juices to saturate the inner portions and outer surfaces evenly flavoring and cooking the meat without basting or turning the meat which is thoroughly tenderized and given an attractive color.

8 Claims, 6 Drawing Figures

COOKING STRUCTURE

Figure 1:
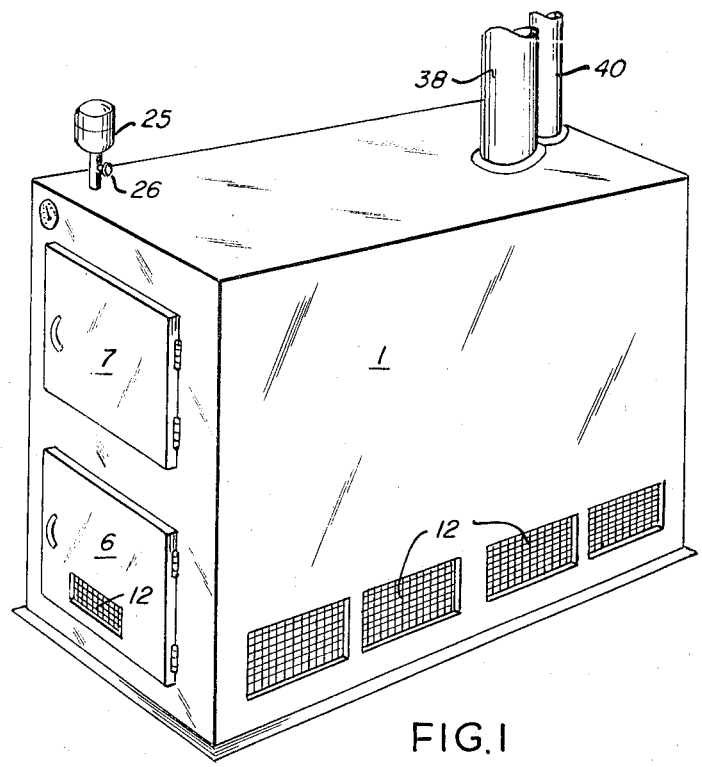
FIG. 1 is a perspective of the preferred complete assembly of the cooking ovens and casing.
Figure 2:
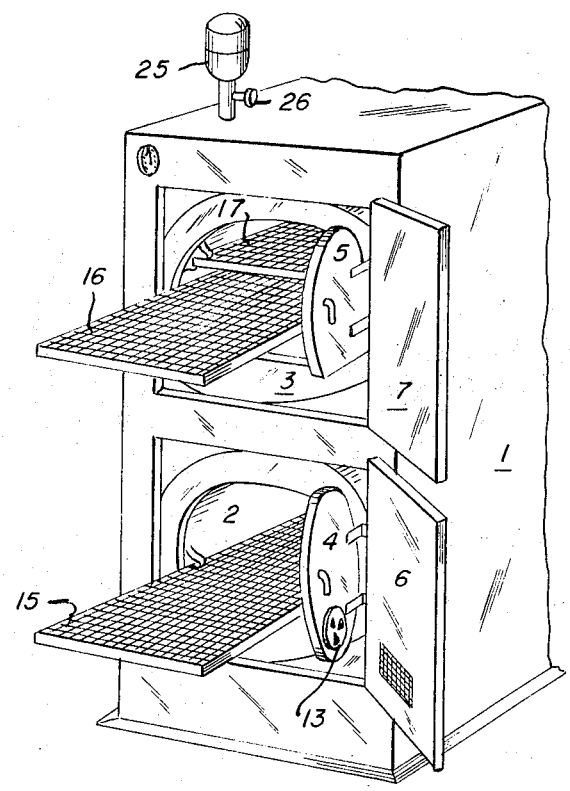
FIG. 2 is a perspective of the front end of the casing with end doors of the casing and ovens opened and showing the oven grills partly withdrawn.
Figure 5:
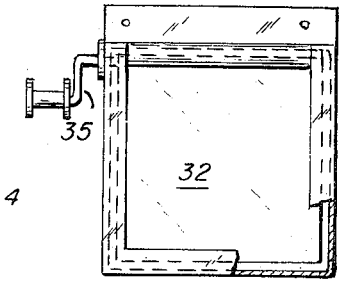
FIG. 5 is a view, partly in section, of the main flue damper positioned to close the outlet from the flue into the upper oven.
Figure 4:
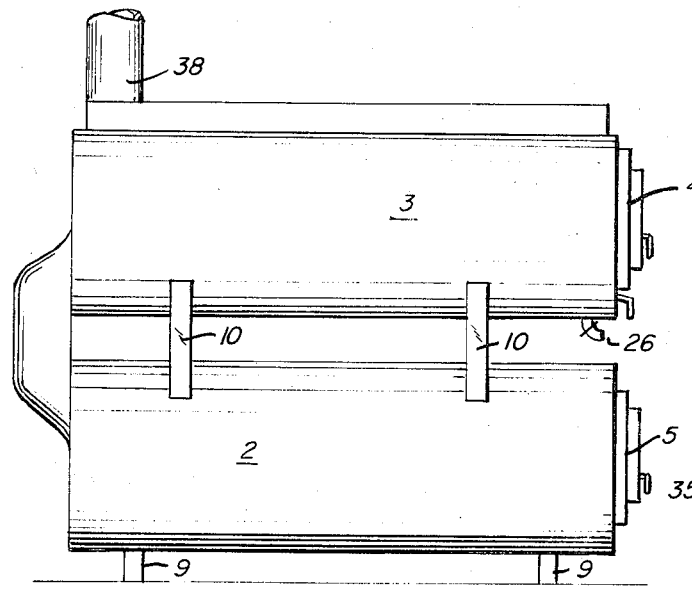
FIG. 4 is a side elevation of the two ovens removed from the casing.
Figure 6:
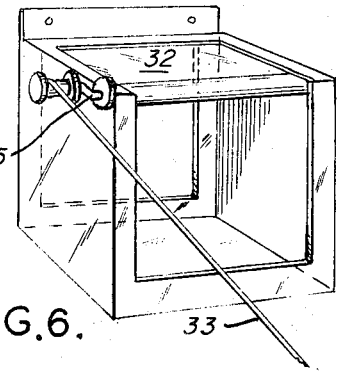
FIG. 6 is a perspective of the damper swung to deflect the products of combustion into the upper oven.
Figure 3:
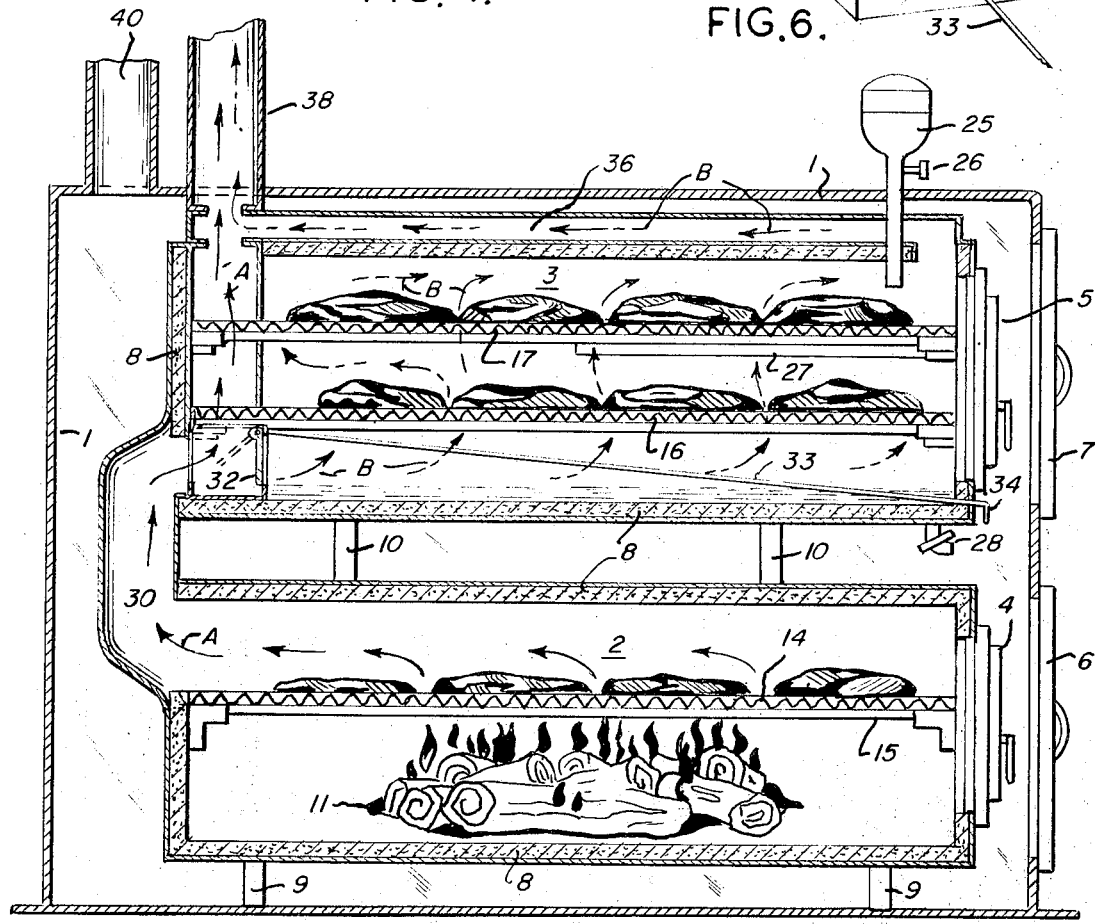
FIG. 3 is a longitudinal vertical section through the assembly.

DETAILED DESCRIPTION:

The outer jacket or casing 1 is a sheet metal box enclosing the ovens 2 and 3 which are oval in cross section and have individual doors 4 and 5 immediately behind casing doors 6 and 7. Each oven is of heavy gauge steel covered with thick insulation 8, and mounted on legs 9 and 10 respectively which space the ovens from the bottom of the casing and from each other.

The lower portion of oven 2 comprises a firebox 11 for charcoal or logs. Openings 12 in the casing provide for admission of air to its interior. Inlet 13 in door 4 admits air to oven 2. A grill 14 extends horizontally midway of the height of oven 2 and is slidably mounted on supporting brackets 15 and may be inserted and withdrawn through the opened door 4 of the oven and corresponding door 6 of the casing. Upper oven 3 has two similar grills 16, 17 spaced one above the other and removable through opened doors 5 and 7.

A reservoir 25 above casing 1 has a discharge valve 26 and may be used to supply water or sauce to the food on grill 17. Liquid and grease may accumulate in a removable tray 27 or may be discharged from the bottom of the upper oven through a drain cock 28.

An exhaust flue 30 leads the products of combustion in the firebox upwardly from the left-hand end of firebox 11 and through the casing as indicated by solid-line arrows A, particularly when starting the fire or increasing the draft. A hinged damper 32 on the flue wall may be shifted by a rod 33 having a handle 34 at the front of oven 3 and connected to a crank 35 on the damper. Damper 32 may deflect heat and smoke from firebox 11 into the adjacent left-hand lower portion of upper oven 3 (see dot-dash arrows B) and then passed throughout the length of oven 3 where they coil about the meat or other food on grills 16, 17 and are admitted to an upper passageway 36 leading to the upper portion of flue 30 and discharged to the atmosphere through a chimney 38 extending through the casing. Air within casing 1 may be vented at 40 independently of chimney 38.

Grill 14 in the lower oven is well adapted for charcoal broiling foot at the same time as food in the upper oven is being barbecued, and will be free of sauce or other flavoring from reservoir 25.

Obviously the shape and extent of the ovens may be varied, as well as other details, and some features described may be omitted without departing from the spirit of the invention as set forth in the appended claims.

I claim:

1. In a cooking structure, lower and upper elongated horizontal ovens, one above the other, each having an end door and a grill accessible therethrough, the lower of said ovens forming a firebox below its grill, a passage for the products of combustion in said firebox leading from said lower oven to said upper oven, a passage for said products from said upper oven to the atmosphere, there being a flue leading from said lower oven direct to the atmosphere, and a damper in said flue which may be actuated manually to direct the products of combustion from the lower oven into said flue or into said upper oven.

2. A cooking structure as described in claim 1 in which the ovens are spaced apart and insulated from each other.

3. A cooking structure as described in claim 1 in which the outlet from the lower oven is at one end thereof, and the passage for the products of combustion extends throughout the length of the upper oven and has an inlet adjacent the end of the oven remote from the flue and has an outlet directly into said flue.

4. A cooking structure as described in claim 1 in which a grill in each oven with food thereon is removable through the oven door.

5. A cooking structure as described in claim 1 in which an open-top tray for water is immediately below the grill in the upper oven and affords means for steaming food on the grill.

6. In a cooking structure, lower and upper elongated horizontal ovens, one above the other, each having an end door and a grill accessible therethrough, the lower of said ovens forming a firebox below its grill, a passage for the products of combustion in said firebox leading from said lower oven to said upper oven, a passage for said products from said upper oven to the atmosphere, both ovens being enclosed in a casing, the walls of which are spaced from the ovens, the casing having doors adjacent the oven doors, and the grills in the ovens being accessible through both the casing and the oven doors.

7. A cooking structure as described in claim 6 in which a reservoir for liquid is mounted on the exterior of the casing with an outlet tube leading downwardly into the upper oven and discharging to a grill therein.

8. A cooking structure as described in claim 6 in which there is a flue leading from said lower oven direct to the atmosphere, said flue extending through the casing to the exterior thereof, and the casing has a ventilating outlet independent of the flue.

* * * * *